US006186334B1

(12) United States Patent
Dohmann et al.

(10) Patent No.: US 6,186,334 B1
(45) Date of Patent: Feb. 13, 2001

(54) METHOD OF AND APPARATUS FOR SCREENING BULK MATERIAL

(75) Inventors: Heinrich Dohmann; Hans-Heinrich Westendarp, both of Braunschweig (DE)

(73) Assignee: Waeschle GmbH, Weingarten (DE)

( * ) Notice: Under 35 U.S.C. 154(b), the term of this patent shall be extended for 0 days.

(21) Appl. No.: 09/212,633

(22) Filed: Dec. 16, 1998

(30) Foreign Application Priority Data

Dec. 17, 1997 (DE) .............................................. 197 56 099

(51) Int. Cl.[7] ................................ B07B 4/00; G01H 1/00

(52) U.S. Cl. ....................... 209/139.1; 209/142; 209/154; 209/590; 73/646

(58) Field of Search .................................... 209/133, 138, 209/139.1, 142, 143, 154, 590; 73/645, 646

(56) References Cited

U.S. PATENT DOCUMENTS 4,222,859 * 9/1980 Medlock .......................... 209/154 X
4,576,286 * 3/1986 Buckley et al. ................. 209/590 X
4,602,716 * 7/1986 Barla-Szabo et al. ........... 209/590 X
5,152,604 * 10/1992 Paul ................................ 209/154 X
5,351,832 * 10/1994 Abbott et al. ..................... 209/139.1
5,458,245 10/1995 Heckel et al. .................... 209/139.1

FOREIGN PATENT DOCUMENTS 10 70 478 12/1959 (DE) .
24 14 819 C3 10/1975 (DE) .
33 00 327 C2 7/1984 (DE) .
39 40 560 A1 6/1990 (DE) .
0 000 827 2/1979 (EP) .
0 112 619 7/1984 (EP) .
6-186069 * 7/1994 (JP) ..................................... 209/154

* cited by examiner

*Primary Examiner*—Tuan N. Nguyen
(74) *Attorney, Agent, or Firm*—Henry M. Feiereisen

(57) ABSTRACT

In a method of screening bulk material, a gas is conducted in counterflow to a direction of movement of bulk material for separating the bulk material into a fraction of coarse particles and a fraction of fine particles. In order to limit the amount of coarse particles in the outgoing fraction of fine particles, the amount of coarse particles contained in the fraction of fine particles is measured and compared with a desired value. When encountering a deviation of the measured the amount of coarse particles contained in the fraction of fine particles form the desired value, the energy of gas is so controlled as to match the amount of coarse particles contained in the fraction of fine particles with the desired value.

13 Claims, 1 Drawing Sheet

METHOD OF AND APPARATUS FOR SCREENING BULK MATERIAL

CROSS-REFERENCES TO RELATED APPLICATIONS

This application claims the priority of German Patent Application, Serial No. 197 56 099.7, filed Dec. 17, 1997, the subject matter of which is incorporated herein by reference.

BACKGROUND OF THE INVENTION

The present invention relates to a method of and apparatus for screening bulk material.

It is known to use pneumatic sifters for screening granulate bulk material. These pneumatic sifter are available in a wide variety of different designs, such as counterflow sifters, deflection sifters etc., and can be configured also as zigzag sifters. While in counterflow sifters, the sifting gas is conducted in opposition to the bulk material being screened, in deflection sifters the gas flow is typically conducted transversely to the flow direction of bulk material. Regardless of the type of pneumatic sifter being used, all designs require a very precise setting of the energy of gas, e.g. air, to be supplied. If the air energy is too weak, the separation of the fraction of fine particles will not be satisfactory. On the other hand, if the gas energy is excessive, the amount of coarse particles being entrained together with the fraction of fine particles is too high. This causes a problems, in particular, when different mixtures of bulk material are repeatedly screened, so that a correct adjustment of the air energy can normally be carried out only on the basis of empirical observation and only approximated.

SUMMARY OF THE INVENTION

It is thus an object of the present invention to provide an improved method and apparatus for screening bulk material, obviating the afore-stated drawbacks.

In particular, it is an object of the present invention to provide an improved method and apparatus for screening bulk material by which the gas energy (quantity, velocity) is precisely adjusted in a simple and rapid manner, even when screening varying mixtures of bulk material.

These objects, and others which will become apparent hereinafter, are attained in accordance with the present invention by conducting a gas in counterflow to a direction of movement of incoming granulate bulk material for separating a fraction of fine particles from a fraction of coarse particles, determining the amount of coarse particles carried with the fraction of fine particles, comparing the determined amount with a desired value, and changing the energy of gas in dependence on the comparison between the determined amount and the desired value so as to match the determined amount with the desired value.

The determination of the amount of coarse particles contained in the fraction of fine particles can be carried out at any point after separation of the fraction of fine particles, and depends on the demands at hand, e.g. speed of control system. Preferred is a location, for example, immediately after the sifter, or a location in or after a separator positioned downstream of the sifter.

In principle, any process that is suitable to determine the amount of coarse particles in the outgoing fraction of fine particles may be applicable within the scope of the present invention. An example includes screening of cleaned granulate bulk material and subsequent weighing (or determination of volume) of the individual fractions. This process is, however, time consuming, which may be of secondary considerations when fairly even mixtures of bulk material are involved. However, when less homogenous mixtures are used, such as plastic granulates, and quantities of fine particles are encountered in the sifter, the gas energy must be correctly adjusted in a relatively rapid manner.

Therefore, according to a preferred embodiment of the present invention, the determination of the amount of coarse particles entrained together with the exiting fraction of fine particles is realized by having the outgoing granulate bulk material stream, which is carried by the gas stream, impact on a sound3 emanating surface, and analyzing the structure-borne noise. Sound analysis has been applied, for example, for observing the operation of ball mills or of die casting machines. Examples of sound analysis processes are described in German Pat. Nos. DE-C-10 70 478, or DE-C-24 14 819, or DE-A-39 40 560, or DE-A-33 00 327, or European Pat. Nos. EP-A-0 000 827, or EP-A-0 112 619.

Preferably, the sound-emanating surface is formed by at least one impact plate which projects into the flow path of the outgoing gas stream.

In accordance with the present invention, an apparatus for screening granulate bulk material includes a pneumatic sifter having a gas inlet and a gas outlet, a sound-emanating area incorporated in the gas outlet and generating noise upon impact of granule-laden gas stream, a microphone actuated by sound waves radiating from the sound-emanating area upon impact of the granule-laden gas stream, and delivering an output signal, a sound analyzer having a comparator for comparing the output signal with a desired value and delivering an output signal, and an actuator operated by the sound analyzer for adjusting a gas energy of the gas stream in dependence of the output signal of the sound analyzer.

BRIEF DESCRIPTION OF THE DRAWING

The above and other objects, features and advantages of the present invention will now be described in more detail with reference to the accompanying drawing in which the sole

DETAILED DESCRIPTION OF PREFERRED EMBODIMENTS

Figure 1:
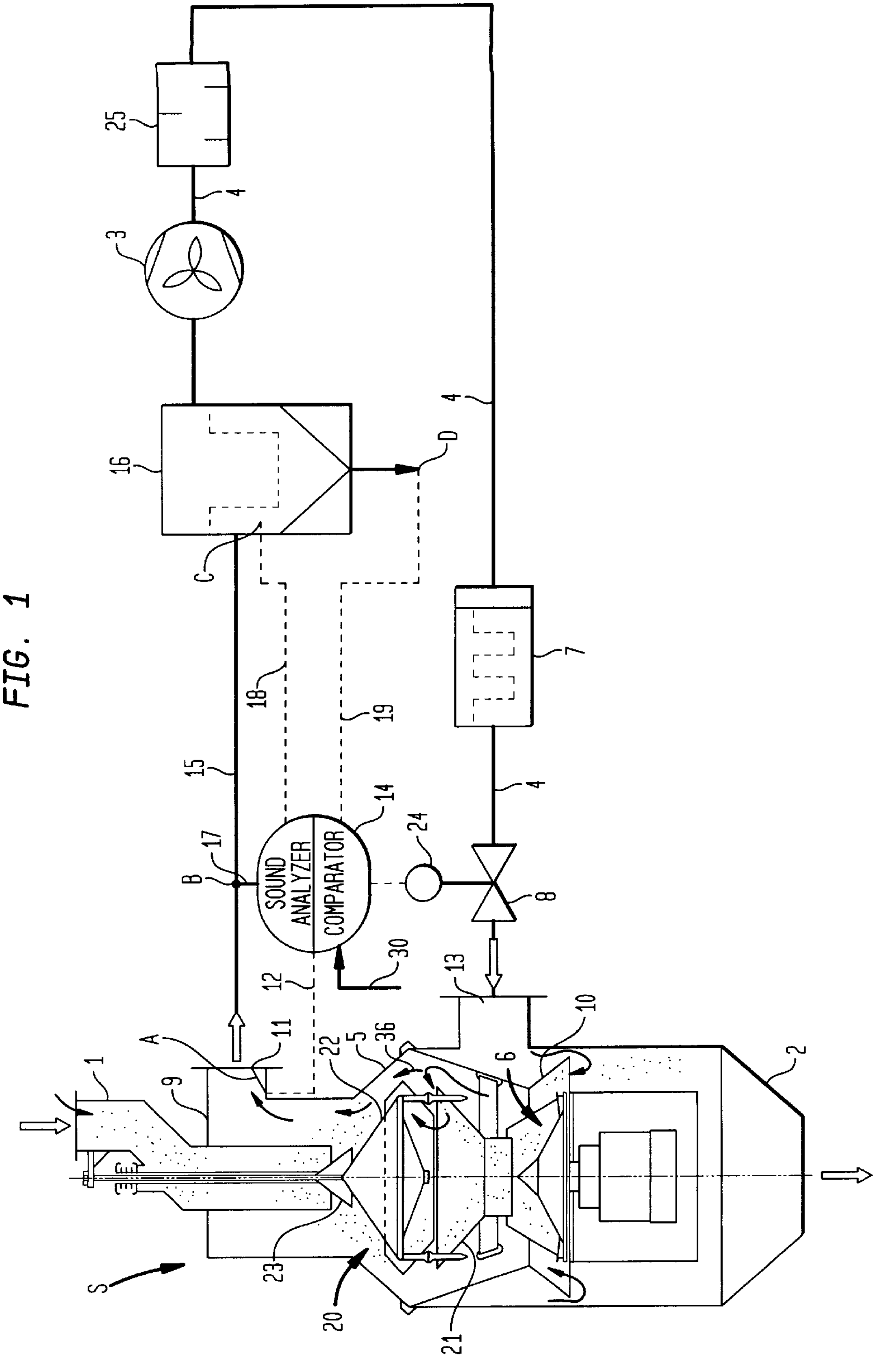
FIG. 1 shows a schematic illustration of an apparatus for screening bulk material, embodying the present invention.

Turning now to FIG. 1, there is shown a schematic illustration of an apparatus for screening bulk material, embodying the present invention and generally designated by reference character S. By way of example, the apparatus is designed in the form of a counterflow sifter. A specific construction and manner in which a pneumatic sifter of this type is typically operated is fully described in U.S. Pat. No. 5,458,245, the entire specification and drawings of which are expressly incorporated herein by reference. Persons skilled in the art will appreciate, however, that the principles described in the following description are equally applicable to other types of sifters such as e.g. cross-flow sifters, deflection sifter, or other pneumatic sifters.

The counterflow sifter S has a housing 5 formed with an upper inlet 1 for introduction of granulate bulk material containing coarse particles and fine particles, and an outlet 2 for discharge of bulk material granules on its lower side. Accommodated in the housing 5 is a retention unit 20 for realizing a pre-separation of fine particles. The retention unit 20 includes a feed hopper 21 and a guiding cone 22 disposed above the feed hopper 21 and interacting with a conical metering valve 23. The feed hopper 21 is positioned above a distributing plate 6 for directing bulk material into the path of a gas stream which flows in counterflow to remove a fraction of fine (or unwanted) particles from the bulk material flow, while coarse particles exit through the outlet 2. It will be appreciated by persons skilled in the art that the specific construction and manner in which the counterflow sifter S operates is described in more detail in aforementioned U.S. Pat. No. 5,458,245 so that further discussion thereof is omitted for the sake of simplicity.

Sifting gas, typically air, is supplied by a suitable source, e.g. by a fan 3, and enters the housing 5 via a conduit 4 through a lateral inlet port 13. Suitably, a sound absorber 25 is disposed in the conduit 4 downstream of the fan 3. The air flow generated by the fan 3 and forced through the conduit 4 is conducted across a filter 7 before being introduced through inlet port 13 into the housing 5. Disposed in the conduit 4 downstream of the filter 7 before the inlet port 13 is an air flow controller 8, e.g. a proportional valve. After entering the inlet port 13, the air flow is deflected by a baffle plate 10 and flows upwardly in direction of arrow 36 in opposition to the downward flow of bulk material to separate fine particles. The air flow laden with fine particles leaves the housing 5 through an outlet port 9.

Located inside the outlet port 9 is an impact area labeled A and formed by an impact plate 11 which is impacted by the bulk material fraction entrained by the air flow when leaving the housing 5 through the outlet port 9. By striking the impact plate 11, the granules entrained by the gas stream generate a sound which is defined by frequencies that are substantially dependent on the size of the particles and registered by a sound analyzer 14. Thus, the frequencies can be used as measure for the fraction of coarse particles which is contained in the bulk material stream entrained by the gas flow and substantially comprised of the fraction of fine particles. As the fraction of coarse particles is intended to flow downwards toward the outlet 2, while the fraction of fine particles exits through outlet 9, an excessive amount of coarse particles in the exiting gas stream translates in an increased sound generation, indicating an inefficient operation of the pneumatic sifter S.

Persons skilled in the art will appreciate that the incorporation of the impact plate 11 is a preferred embodiment because sound frequencies can be kept within predetermined limits; However, it is certainly within the scope of the present invention to make the outlet 9 of such material that enables generation of structure-borne noise upon impact of granules. Also, the particular location of the impact plate 11 should be selected in such a way that coarse particles contained in the outflowing gas stream definitely strike the impact plate 11. When using pipelines as areas to radiate sound, it should be taken into account that these areas, as a consequence of increased dimensions of the pipelines, are subject to a greater extent to changes due to moisture and temperature so that the sound analyzer 14 should periodically be re-adjusted.

Sound generated by impacting granules is suitably received by a microphone, e.g. a structure-borne sound microphone, which is accommodated in a line 12 (shown in dashed representation) and forms an output signal commensurate with the detected sound level. The output signal is transmitted to a conventional sound analyzer 14 ("FQIC$^{+}$") for processing the output signal of the microphone. Persons skilled in the art will appreciate that the structure and operation of the sound analyzer 14 are generally known and not described in more detail for sake of simplicity.

Integrated in the sound analyzer 14 is a comparator which compares the output signal received by the microphone with a desired value inputted at 30 and commensurate to a predetermined, admissible fraction of coarse particles contained in the fraction of fine particles carried away by the air flow. Based on the comparison, the sound analyzer 14 generates an output signal for operating an adjustment device 24, e.g. an electromotor, for actuating the control valve 8.

In principle, it is not necessarily required to control the amount of gas by means of the control valve 8 because in conjunction with sifters, it is the relative energy of the gas stream in relationship to the supplied amount of bulk material that is crucial for carrying out an effective screening operation. Thus, although control of the amount of gas being used in the system is a preferred embodiment, it is certainly within the scope of the present invention to incorporate in the system controllers that modify the gas velocity or the amount of bulk material.

The outlet port 9 is fluidly connected to a conduit 15 for directing the outgoing air flow, laden primarily with the fraction of fine particles, to a separator 16, e.g. a filter. Instead of using a filter, it is certainly within the scope of the present invention to utilize a cyclone or any other suitable separator, such as a zigzag sifter. Optionally, as indicated symbolically by reference character B, the conduit 15 may have incorporated therein a further impact plate which interacts with a microphone (not shown) to receive sound emanating from particles that strike the impact plate at B, with the microphone transmitting a commensurate output signal to the sound analyzer 14 via line 17. Certainly, instead of being utilized as a separate sound-emanating area in addition to the impact plate 11, the impact plate at B may also be used as an alternative to the impact plate 11.

The separator 16 offers two more options to provide sound-emanating surfaces such as impact plates, i.e. as indicated by reference character C, the provision of an impact area in proximity of the inlet into the separator 16, and, as indicated by reference character D, the provision of an impact plate in proximity of the outlet from the separator 16, with the impact area C being operatively connected via a suitable microphone (not shown) to the sound analyzer 14 by line 18, and with the impact area D being operatively connected via a suitable microphone (not shown) to the sound analyzer 14 by line 19.

It will be appreciated by persons skilled in the art that the sound-emanating impact areas A, B, C, D may be commonly operated, or it is certainly possible to only operate some of the impact areas A, B, C, D. A multiple measurement of the sound level at different impact areas produces additional information about size and composition of the entrained fraction of bulk material. The selection of which of the sound-borne areas A, B, C, D should be used depends largely on the dimensions of the apparatus, on the type of bulk material, and on the required speed of control. Clearly, the control system as employed by the present invention runs slower and more sluggish (PI part) the farther the impacts areas A, B, C, D are located from the sifter S (or purifier) being controlled.

While the invention has been illustrated and described as embodied in a method of and apparatus for screening bulk material, it is not intended to be limited to the details shown since various modifications and structural changes may be made without departing in any way from the spirit of the present invention.

What is claimed as new and desired to be protected by Letters Patent is set forth in the appended claims:

1. A method of screening bulk material, comprising the steps of:

conducting a gas in counterflow to a direction of movement of granulate bulk material for separating the granulate bulk material in at least a fraction of fine particles and in at least a fraction of coarse particles;

determining the amount of coarse particles carried with the fraction of fine particles through impact on a sound-emanating surface formed by at least one impact plate projecting into a flow path of the gas;

comparing the determined amount with a desired value; and changing the energy of gas when the determined amount deviates from the desired value to thereby match the determined amount with the desired value.

2. The method of claim 1 wherein said determining step includes forcing the coarse particles, received during purification of the granulate bulk material, to impact on the sound-emanating surface, and analyzing the sound emanating from the surface upon impact of the coarse particles.

3. The method of claim 1 wherein the gas energy of the conducted gas is changed by modifying the amount of conducted gas.

4. The method of claim 1, and further comprising the step of subjecting the gas to a cleaning process.

5. A method of screening bulk material, comprising the steps of:

introducing granulate bulk material into a sifter;

conducting a gas in the sifter for separating a fraction of unwanted particles from the bulk material and carrying the fraction of unwanted particles to an outlet while cleaned granulate bulk material exits the sifter through another outlet;

determining the amount of coarse particles carried by the gas in the fraction of unwanted particles through impact on a sound-emanating surface formed by at least one impact plate protecting into a flow path of the gas;

comparing the determined amount with a desired value; and controlling a system parameter in dependence on the comparison between the determined amount and the desired value so as to match the determined amount with the desired value.

6. The method of claim 5 wherein said determining step includes forcing the fraction of unwanted particles to impact on the sound-emanating surface, and analyzing the sound emanating from the surface upon impact of the unwanted particles.

7. The method of claim 5 wherein said controlling step includes modifying the amount of gas conducted in the sifter.

8. The method of claim 5 wherein said controlling step includes modifying the velocity of gas conducted in the sifter.

9. The method of claim 5 wherein said controlling step includes modifying the amount of bulk material introduced into the sifter.

10. Apparatus for screening bulk material into at least a fraction of fine particles and at least a fraction of coarse particles, comprising:

a pneumatic sifter having an inlet for introduction of bulk material, a gas inlet for introduction of gas and a gas outlet;

a sound-emanating member provided in an area of discharge of outgoing gas flow and formed by at least one impact plate positioned in an area of discharge of the outgoing gas flow;

a microphone actuated by sound waves radiating from the sound-emanating member when impacted by particles carried by the gas to the outlet, and delivering an output signal;

a sound analyzer having a comparator for comparing the output signal with a desired value and delivering an output signal; and an actuating member operated by the sound analyzer for adjusting a gas energy in dependence of the output signal of the sound analyzer.

11. The apparatus of claim 10 wherein the actuating member is a controller for regulating the amount of gas introduced through the gas inlet.

12. Apparatus for screening granulate bulk material, comprising:

a housing having a first inlet for introduction of bulk material, a second inlet for introduction of gas for separating a fraction of unwanted particles from the bulk material and carrying the fraction of unwanted particles to a first outlet while cleaned granulate bulk material exits the sifter through a second outlet;

measuring means for determining the amount of coarse particles carried by the gas in the fraction of unwanted particles, said measuring means including a sound-emanating member formed by at least one impact plate positioned in the area of the first outlet, and a microphone actuated by sound waves radiating from the sound-emanating member when impacted by the fraction of unwanted particles carried by the gas, to thereby deliver an output signal;

a sound analyzer for comparing the output signal with a desired value; and actuating means for controlling a system parameter in dependence on the comparison between the determined amount and the desired value so as to match the determined amount with the desired value.

13. The apparatus of claim 12 wherein the actuating means includes is a control valve for regulating the amount of gas introduced through the gas inlet.

* * * * *

UNITED STATES PATENT AND TRADEMARK OFFICE

CERTIFICATE OF CORRECTION

PATENT NO. : 6,186,334 B1
DATED : February 13, 2001
INVENTOR(S) : Heinrich Dohmann & Hans-Heinrich Westendarp It is certified that error appears in the above-identified patent and that said Letters Patent is hereby corrected as shown below:

Column 5,
Line 36: change "protecting" to -- projecting --.

Signed and Sealed this

Twenty-eighth Day of August, 2001

*Attest:*

Nicholas P. Godici

NICHOLAS P. GODICI
*Acting Director of the United States Patent and Trademark Office*

*Attesting Officer*